Patented Jan. 15, 1935

1,988,010

UNITED STATES PATENT OFFICE 1,988,010

SOLDER

Edward J. Kratz, Springdale, Pa., assignor to Aluminum Company of America, Pittsburgh, Pa., a corporation of Pennsylvania No Drawing. Application July 30, 1932, Serial No. 627,141

9 Claims. (Cl. 75—1)

This invention relates to the joining of aluminum and its alloys by soldering and particularly to a composition of matter and a process for effecting such soldering. An object of my invention is the provision of a composition of matter which, when used to join aluminum or aluminum base alloy to aluminum or aluminum base alloy or to other metal or alloy, forms a joint which is resistant to corrosion, strong, tough, and which can be readily produced. Another object of the invention is the provision of a process for applying the solder composition. Further objects will be apparent from the following discussion of the invention.

The desirable characteristics of a good soldering composition are good adherence, ease of application, freedom from brittleness and resistance to corrosion. While in the past many soldering compositions have been disclosed, none of these previous compositions have met with commercial favor due to the failure to qualify in one or more of these desiderata. All of the authoritative literature to date has, in effect, concluded that a permanent soldered joint for aluminum is not feasible, because of the readiness with which the joint corrodes on exposure to moisture, salt air and salt water. Other factors tend to accelerate this corrosion, such as residual flux, when a flux is used, and over-heating of the metal to be soldered during the soldering operation.

I have found that a solder containing substantially 17 to 40 per cent by weight of tin, 35 to 55 per cent by weight of zinc, and 15 to 32 per cent by weight of cadmium best fulfills the requirements for a solder composition. While the composition of the solder can be varied within these limits without materially affecting the quality of the solder, the following mixtures are preferable:

Percentage by weight

| Composition | Tin | Zinc | Cadmium | Freezing point (°F.) |
|---|---|---|---|---|
| I | 20 | 53 | 27 | 617 |
| II | 20 | 48 | 32 | 604 |
| III | 30 | 53 | 17 | 630 |
| IV | 30 | 46 | 24 | 599 |
| V | 30 | 42 | 28 | 595 |
| VI | 40 | 36 | 24 | 581 |

When tin is present in amounts appreciably less than 17 per cent or more than 40 per cent, it produces a decidedly inferior solder, and the best results are obtained when the tin is present in amounts substantially equal to 20 per cent. The most satisfactory composition from all considerations is that identified as composition II. As can be seen from the table, the maximum range of the freezing points of these solders is within 49 degrees Fahrenheit. These solders can be applied by any of the well known soldering processes, such as pouring, dipping, or the use of an iron, either with or without the use of a flux, depending on the cleanness of the metal and its freedom from oxide. Fluxes are particularly desirable when the solder is to be applied either by pouring or dipping, and while many flux compositions are satisfactory for use with this solder, I prefer the fluxes shown in the copending applications of Callis and Derr, Serial No. 639,841 and Serial No. 639,842, filed October 27, 1932, and Serial No. 649,325, filed December 29, 1932.

Such a flux may consist, for example, of about 5 per cent stannous bromide, 40 per cent cadmium chloride, 20 per cent cadmium iodide, 25 per cent ammonium chloride, 2 per cent ammonium fluoride, and 8 per cent zinc chloride, by weight, to which is added a vehicle. This vehicle consists of a mixture of chlorinated diphenyl and chlorinated naphthalene melted together and to which is added up to about 15 per cent by weight of para-dichlor-benzene or cyclohexanol to secure any desired degree of fluidity. The salt flux and the vehicle are finally mixed together in the approximate proportions of about 4 parts of the salts to 6 parts of the vehicle.

The solder can be applied at any temperature at or above its freezing point, but I have found that if applied at temperatures substantially above its freezing point better results are obtained. Decidedly better results are obtained if the solder is applied at temperatures at least 150 degrees Fahrenheit above its freezing point, and the best results are obtained if applied at temperatures between 700 and 900 degrees Fahrenheit. The solder, even at these elevated temperatures, is substantially free from dross and is easily applied, as it flows readily, penetrates small cracks, and follows the iron well when an iron is used.

The mechanical properties of the solder are exceptionally good. As an example, composition II has a tensile strength of approximately 16,200 pounds per square inch with an elongation of 7 per cent. Tests on joints formed between two flat strips of aluminum by placing them end to end with the abutting edges beveled, and filling the V thus formed with solder applied with an iron at a temperature of 800 degrees Fahrenheit, gave a tensile strength of 13,200 pounds per square inch.

Specimens prepared in the above manner have been exposed to highly corrosive action by immersion in a 5 per cent calcium chloride solution for six months without failure, and have withstood the action of a salt spray test for a period of 8 weeks without any diminution of the tensile strength of the soldered joints.

Various examples are given hereinabove in order that the operation of my invention may be readily comprehended, but it is to be understood that these examples are given by way of illustration only and not as limitations, and that my invention may be variously embodied within the scope of the appended claims.

I claim:

1. A solder for aluminum and its alloys composed of 17 to 40 per cent by weight of tin, 35 to 55 per cent by weight of zinc and 15 to 32 per cent by weight of cadmium, the weight of zinc being at least 1.5 times as great as the weight of cadmium.

2. A solder for aluminum and its alloys composed of 30 per cent by weight of tin, 42 to 53 per cent by weight of zinc and 17 to 28 per cent by weight of cadmium.

3. A solder for aluminum and its alloys composed of 20 per cent by weight of tin, 48 to 53 per cent by weight of zinc and 27 to 32 per cent by weight of cadmium.

4. A solder for aluminum and its alloys composed of 20 per cent by weight of tin, 48 per cent by weight of zinc and 32 per cent by weight of cadmium.

5. A solder for aluminum and its alloys composed of 40 per cent by weight of tin, 36 per cent by weight of zinc and 24 per cent by weight of cadmium.

6. In a process for soldering aluminum and its alloys, the step which includes the application of a solder composed of 17 to 40 per cent by weight of tin, 35 to 55 per cent by weight of zinc and 15 to 32 per cent by weight of cadmium at a temperature at least 150 degrees Fahrenheit above the freezing point of the solder.

7. In a process for soldering aluminum and its alloys, the step which includes the application of a solder composed of 17 to 40 per cent by weight of tin, 35 to 55 per cent by weight of zinc and 15 to 32 per cent by weight of cadmium at a temperature between 700 and 900 degrees Fahrenheit.

8. In a process for soldering aluminum and its alloys, the step which includes the application of a solder composed of 20 per cent by weight of tin, 48 per cent by weight of zinc and 32 per cent by weight of cadmium at a temperature at least 150 degrees Fahrenheit above the freezing point of the solder.

9. A solder for aluminum and its alloys composed essentially of 17 to 40 per cent by weight of tin with the remainder zinc and cadmium, the weight of zinc being substantially 1.5 to 3 times the weight of cadmium, and the weight of cadmium being not substantially greater than 32 per cent by weight of the total mixture.

EDWARD J. KRATZ.